United States Patent
Vityuk et al.

(10) Patent No.: US 11,745,161 B2
(45) Date of Patent: Sep. 5, 2023

(54) ARSINE ADSORBENTS

(71) Applicant: BASF Corporation, Florham Park, NJ (US)

(72) Inventors: Artem D. Vityuk, Plainsboro, NJ (US); Linda Hratko, Colonia, NJ (US); Alfonse Maglio, River Edge, NJ (US)

(73) Assignee: BASF Corporation, Florham Park, NJ (US)

( * ) Notice: Subject to any disclaimer, the term of this patent is extended or adjusted under 35 U.S.C. 154(b) by 200 days.

(21) Appl. No.: 16/760,622

(22) PCT Filed: Nov. 2, 2018

(86) PCT No.: PCT/US2018/058952
§ 371 (c)(1),
(2) Date: Apr. 30, 2020

(87) PCT Pub. No.: WO2019/090071
PCT Pub. Date: May 9, 2019

(65) Prior Publication Data
US 2021/0178358 A1 Jun. 17, 2021

Related U.S. Application Data

(60) Provisional application No. 62/581,265, filed on Nov. 3, 2017.

(51) Int. Cl.
*B01J 20/06* (2006.01)
*B01J 20/28* (2006.01)
*B01J 20/32* (2006.01)
*B01D 53/02* (2006.01)

(52) U.S. Cl.
CPC .............. *B01J 20/06* (2013.01); *B01D 53/02* (2013.01); *B01J 20/28004* (2013.01); *B01J 20/2808* (2013.01); *B01J 20/28042* (2013.01); *B01J 20/28059* (2013.01); *B01J 20/28061* (2013.01); *B01J 20/28064* (2013.01); *B01J 20/28071* (2013.01); *B01J 20/28073* (2013.01); *B01J 20/28076* (2013.01); *B01J 20/28083* (2013.01); *B01J 20/28085* (2013.01); *B01J 20/3204* (2013.01); *B01J 20/3236* (2013.01); *B01D 2253/1124* (2013.01); *B01D 2253/25* (2013.01); *B01D 2257/93* (2013.01); *B01D 2258/0216* (2013.01)

(58) Field of Classification Search
CPC .................. B01J 20/06; B01J 20/28004; B01J 20/28042; B01J 20/28059; B01J 20/28051; B01J 20/28061; B01J 20/28064; B01J 20/28071; B01J 20/28073; B01J 20/2808; B01D 53/02
See application file for complete search history.

(56) References Cited

U.S. PATENT DOCUMENTS

| | | |
|---|---|---|
| 4,474,896 A | 10/1984 | Chao |
| 6,383,273 B1 | 5/2002 | Kepner et al. |
| 2004/0254057 A1 | 12/2004 | Schreder et al. |
| 2004/0262546 A1 | 12/2004 | Thies et al. |
| 2008/0200742 A1 | 8/2008 | Doyle et al. |
| 2009/0054691 A1 | 2/2009 | Redlingshofer et al. |
| 2009/0246111 A1 | 10/2009 | Kato et al. |
| 2014/0039213 A1* | 2/2014 | Raichle .................. C07C 45/28 558/324 |
| 2016/0346768 A1 | 12/2016 | Wrobel et al. |

FOREIGN PATENT DOCUMENTS

| | | | |
|---|---|---|---|
| DE | 3816599 | 3/1989 | |
| JP | 2004091276 | 3/2004 | |
| WO | 2009116181 | 9/2009 | |
| WO | 2017030896 | 2/2017 | |
| WO | WO-2017030896 A1 * | 2/2017 | ............. B01D 53/46 |

OTHER PUBLICATIONS

Extended European Search Report for EP Patent Application No. 18 87 3302 dated Jul. 19, 2021, 12 pages.
International Search Report and Written Opinion for International Application No. PCT/US2018/058952 dated Jan. 16, 2019, 13 pages.

* cited by examiner

*Primary Examiner* — Yong L Chu
(74) *Attorney, Agent, or Firm* — Lowenstein Sandler LLP

(57) ABSTRACT

An adsorbent composition comprises a bismuth material, a promoter and optionally a support. The adsorbent composition is suitable for adsorbing an arsenic material, such as arsine, from a process stream.

14 Claims, No Drawings

ARSINE ADSORBENTS

CROSS-REFERENCE TO RELATED APPLICATION(S)

This application is a national stage entry of International Application No. PCT/US2018/058952, filed on Nov. 2, 2018, which claims the benefit of priority of U.S. Provisional Patent Application No. 62/581,265, filed on Nov. 3, 2017, the disclosures of which are hereby incorporated by reference herein in their entireties.

BACKGROUND

The removal of impurities from the process and exhaust streams of industrial processes is extremely important to reduce pollutants and toxins emitted into the environment, recover valuable byproducts, maintain the performance of downstream operations and ensure the safety of workers. Such industrial processes include petroleum, petrochemical, polymerization, synthesis gas ("syngas") and semiconductor processes.

Hydrocarbon process streams, in particular, refinery off gas ("ROG") streams may contain reactive compounds that induce exotherms and/or produce further non-desirable compounds (e.g., acetylide, green oil/cuprene, etc.). Such reactive compounds include acetylene, methyl acetylene and propadiene ("MAPD"), other dienes and heavy olefins as well as hydrogen and carbon monoxide.

Adsorbents containing lead oxide are often used to remove arsine and carbonyl sulfide ("COS") from hydrocarbon streams containing reactive compounds (e.g., acetylene and MAPD) or streams with significant reducing capacity such as hydrogen-containing streams. Lead oxide, however, imposes substantial environmental and health concerns and can affect individual organisms and threaten ecosystems. Therefore, it is of interest to employ alternative materials that would enable safe handling, operation and disposal of adsorbents. Adsorbents containing copper oxide are also used to remove arsine from hydrocarbon streams. However, copper has a tendency to form acetylides and to promote green oil formation, such that copper oxide adsorbents are primarily employed in "non-reactive" streams containing small concentrations or no acetylene, MAPD, dienes, etc. Moreover, in addition to the environmental health and safety concerns mentioned above, lead oxide-based media are generally characterized by somewhat lower capacity towards arsine as compared to copper-based materials.

Therefore, there is a need for alternative and/or improved adsorbents having a higher adsorption capacity of targeted reactive compounds (e.g., an arsenic material such as arsine or arsenic-containing compounds), no hydrogenation capacity to minimize exotherm risk and that do not form further non-desirable compounds, such as, acetylide or green oil/cuprene, for example.

SUMMARY

Disclosed and described herein are arsine adsorbents, methods of their preparation, and methods of their use.

In one aspect of the present disclosure, an adsorbent composition comprises a bismuth material, a promoter and optionally a support.

In some embodiments, the adsorbent composition further comprises an arsenic material.

In some embodiments, the bismuth material and/or the promoter are in a bulk form. In some embodiments, the bismuth material and/or the promoter are in a dispersed form.

In some embodiments, the bismuth material is selected from a group consisting of elemental bismuth and bismuth compounds. In some embodiments, the bismuth material comprises a bismuth oxide. In some embodiments, the bismuth material comprises bismuth (III) oxide ($Bi_2O_3$).

In some embodiments, the composition comprises from about 0.1 wt %, about 0.5 wt %, about 1.0 wt %, about 2.0 wt %, about 3.0 wt %, about 4.0 wt %, about 5.0 wt %, about 6.0 wt %, about 7.0 wt %, about 8.0 wt %, about 9.0 wt % or about 10.0 wt % to about 11.0 wt %, about 12.0 wt %, about 13.0 wt %, about 14.0 wt %, about 15.0 wt %, about 16.0 wt %, about 17.0 wt %, about 18.0 wt %, about 19.0 wt %, about 20.0 wt %, about 25.0 wt %, about 30.0 wt %, about 35.0 wt %, about 40.0 wt %, about 45.0 wt % or about 50.0 wt % of bismuth material on a bismuth metal basis, based on the total weight of the composition.

In some embodiments, the promoter comprises a tungsten material or a silicon material. In some embodiments, the promoter comprises tungsten oxide or silicon oxide.

In some embodiments, the composition comprises from about 0.05 wt %, about 0.1 wt %, about 0.5 wt %, about 1.0 wt %, about 1.5 wt %, about 2.0 wt %, about 2.5 wt %, about 3.0 wt %, about 3.5 wt %, about 4.0 wt %, about 4.5 wt % or about 5.0 wt % to about 5.5 wt %, about 6.0 wt %, about 6.5 wt %, about 7.0 wt %, about 7.5 wt %, about 8.0 wt %, about 8.5 wt %, about 9.0 wt %, about 9.5 wt %, about 10.0 wt %, about 12.5 wt %, about 15.0 wt %, about 17.5 wt %, about 20.0 wt %, about 22.5 wt % or about 25.0 wt % promoter, based on the total weight of the composition.

In some embodiments, the adsorbent composition further comprises a support. In some embodiments, the support is selected from a group consisting of metal oxides, metalloid oxides, activated carbons and molecular sieves. In some embodiments, the support is selected from a group consisting of high surface area metal oxides. In some embodiments, the support comprises titanium dioxide. In some embodiments, the support comprises anatase titanium dioxide. In some embodiments, the support comprises aluminum oxide. In some embodiments, the support comprises titanium dioxide and aluminum oxide. In some embodiments, the support comprises silica.

In some embodiments, the adsorbent material comprises ≥5 wt %, ≥10 wt %, ≥15 wt %, ≥20 wt %, ≥25 wt %, ≥30 wt %, ≥35 wt %, ≥40 wt %, ≥45 wt %, ≥50 wt %, ≥55 wt %, ≥60 wt %, ≥65 wt %, ≥70 wt % or ≥75 wt % of support, based on the total weight of the composition.

In some embodiments, the support comprises ≥5 wt %, ≥10 wt %, ≥15 wt %, ≥20 wt %, ≥25 wt %, ≥30 wt %, ≥35 wt %, ≥40 wt %, ≥45 wt %, ≥50 wt %, ≥55 wt %, ≥60 wt %, ≥65 wt %, ≥70 wt % or ≥75 wt % metal oxide, based on the total weight of the support.

In some embodiments, the support comprises particles having a particle size of from about 1 μm, about 25 μm, about 50 μm, about 100 μm, about 300 μm, about 500 μm, about 750 μm or about 900 μm to about 1 mm, about 2 mm, about 3 mm, about 4 mm, about 5 mm, about 6 mm, about 7 mm, about 8 mm, about 9 mm or about 10 mm.

In some embodiments, the support has a surface area of from about 10 $m^2/g$, about 20 $m^2/g$, about 30 $m^2/g$, about 40 $m^2/g$, about 50 $m^2/g$, about 60 $m^2/g$, about 75 $m^2/g$, about 100 $m^2/g$, about 150 $m^2/g$ or about 200 $m^2/g$ to about 250 m²/g, about 300 m²/g, about 350 m²/g, about 400 m²/g, about 450 m²/g, about 500 m²/g, about 550 m²/g or about 600 m²/g.

In some embodiments, the composition comprises ≤20 wt %, ≤20 wt %, ≤19 wt %, ≤18 wt %, ≤17 wt %, ≤16 wt %, ≤15 wt %, ≤14 wt %, ≤13 wt %, ≤12 wt %, ≤11 wt %, ≤10 wt %, ≤9 wt %, ≤8 wt %, ≤7 wt %, ≤6 wt %, ≤5 wt %, ≤4 wt %, ≤3 wt %, ≤2 wt %, ≤1 wt % or ≤0.5 wt % of lead oxide, based on the total weight of the composition.

In some embodiments, the adsorbent composition is free of or substantially free of lead.

In some embodiments, the adsorbent composition is in a form selected from a group consisting of tablets, extrudates, pellets, rods, moldings and monoliths.

In some embodiments, the adsorbent composition further comprises one or more compounds selected from a group consisting of silver oxide, iron oxide, manganese oxide, cerium oxide, vanadium oxide, tin oxide and niobium oxide.

In some embodiments, the support has a pore volume of from about 0.01 cm³/g, about 0.05 cm³/g, about 0.1 cm³/g, about 0.3 cm³/g, about 0.6 cm³/g, about 0.8 cm³/g, about 1.0 cm³/g, about 1.5 cm³/g or about 2.0 cm³/g to about 2.5 cm³/g, about 3.0 cm³/g, about 3.5 cm³/g, about 4.0 cm³/g or about 5.0 cm³/g.

In some embodiments, the support contains pores having an average pore size of from about 1 Å, about 5 Å, about 10 Å, about 20 Å, about 50 Å or about 100 Å to about 150 Å, about 200 Å, about 250 Å, about 300 Å, about 350 Å, about 400 Å, about 450 Å, about 500 Å, about 550 Å, about 600 Å, about 650 Å, about 700 Å or about 750 Å.

In some embodiments, the adsorbent composition comprises from about 2 wt %, about 3 wt %, about 4 wt %, about 5 wt %, about 6 wt %, about 7 wt %, about 8 wt %, about 9 wt %, about 10 wt % or about 11 wt % to about 12 wt %, about 13 wt %, about 14 wt %, about 15 wt %, about 16 wt %, about 17 wt %, about 18 wt %, about 19 wt % or about 20 wt % bismuth oxide on a bismuth metal basis; from about 1 wt %, about 2 wt %, about 3 wt %, about 4 wt % or about 5 wt % to about 6 wt %, about 7 wt %, about 8 wt %, about 9 wt %, about 10 wt % or about 11 wt % tungsten oxide; and from about 69 wt %, about 72 wt %, about 75 wt %, about 78 wt %, about 81 wt %, about 84 wt %, about 87 wt % or about 90 wt % to about 92 wt %, about 93 wt % or about 94 wt % titania.

In some embodiments, the adsorbent composition exhibits an arsine removal efficiency of ≥90%, ≥91%, ≥92%, ≥93%, ≥94%, ≥95%, ≥96%, ≥97%, ≥98% or ≥99%, as measured by a dry colorimetry method using an arsine analyzer.

In some embodiments, the adsorbent composition exhibits an improved arsine removal efficiency of ≥15%, ≥20%, ≥25%, ≥35%, ≥45%, ≥55%, ≥65%, ≥75%, ≥85%, ≥95%, ≥105%, ≥110%, ≥115%, ≥125% or ≥135%, compared to the same composition not containing the promoter, as measured by a dry colorimetry method using an arsine analyzer.

In some embodiments, the adsorbent composition comprises an arsenic material selected from a group consisting of elemental arsenic and arsenic compounds.

In some embodiments, the adsorbent composition comprises arsine.

In some embodiments, the composition comprises from about 0.01 wt %, about 0.05 wt %, about 0.1 wt %, about 0.5 wt %, about 1.0 wt %, about 2.0 wt %, about 3.0 wt %, about 4.0 wt %, about 5.0 wt %, about 6.0 wt %, about 7.0 wt %, about 8.0 wt %, about 9.0 wt % or about 10.0 wt % to about 11.0 wt %, about 12.0 wt %, about 13.0 wt %, about 14.0 wt %, about 15.0 wt %, about 16.0 wt %, about 17.0 wt %, about 18.0 wt %, about 19.0 wt % or about 20.0 wt % arsenic material, based on the total weight of the composition.

In another aspect of the present disclosure, a method of preparing an adsorbent composition comprises combining a bismuth material or a bismuth precursor, a promoter or a promoter precursor, and optionally a support to form the composition.

In some embodiments, the combining comprises a process selected from a group consisting of co-precipitating, dispersing and physically mixing.

In some embodiments, the method comprises combining elemental bismuth or a bismuth oxide.

In some embodiments, the method comprises dispersing a bismuth material or a bismuth precursor and a promoter or a promoter precursor on a support.

In some embodiments, the method comprises dispersing a bismuth precursor on a support.

In some embodiments, the method comprises combining a bismuth precursor and/or a promoter precursor selected from a group consisting of organic compounds, inorganic compounds, salts and metals.

In some embodiments, the method comprises combining bismuth citrate, bismuth nitrate or a combination thereof.

In some embodiments, the method comprises dispersing a bismuth precursor, for example bismuth citrate and/or bismuth nitrate, on a support.

In some embodiments, the method comprises dispersing a promoter on a support.

In some embodiments, the method comprises dispersing tungsten oxide on a support.

In some embodiments, the method comprises dispersing a promoter precursor on a support.

In some embodiments, the method comprises dispersing a tungsten compound or a tungsten salt on a support.

In some embodiments, the support is selected from a group consisting of metal oxides, metalloid oxides, activated carbons and molecular sieves. In some embodiments, the support comprises a high surface area metal oxide. In some embodiments, the support comprises titanium dioxide. In some embodiments, the support comprises anatase titanium dioxide. In some embodiments, the support comprises aluminum oxide. In some embodiments, the support comprises titanium dioxide and aluminum oxide. In some embodiments, the support comprises silica. In some embodiments, the support has a moisture content of ≤15 wt %, ≤13 wt %, ≤11 wt %, ≤9 wt %, ≤7 wt %, ≤5 wt %, ≤3 wt %, ≤2 wt %, ≤1 wt %, ≤0.5 wt %, ≤0.4 wt %, ≤0.3 wt %, ≤0.2 wt % or ≤0.1 wt %, based on the weight of the support. In some embodiments, the support is substantially moisture free.

In some embodiments, the method comprises combining the promoter or promoter precursor and a support to prepare a supported promoter and subsequently combining the bismuth material or bismuth precursor with the supported promoter.

In some embodiments, the method comprises combining the promoter or promoter precursor and a support to prepare a supported promoter, drying and calcining the supported promoter and combining the bismuth material or bismuth precursor with the dried and calcined supported promoter.

In some embodiments, the method comprises combining the promoter or promoter precursor and a support to prepare a supported promoter, drying and calcining the supported promoter, combining the bismuth material or bismuth precursor with the dried and calcined supported promoter and drying and calcining the resulting composition.

In some embodiments, the method comprises dispersing the promoter or promoter precursor on the support and/or dispersing the bismuth material or bismuth precursor on the supported promoter.

In some embodiments, the method comprises preparing an adsorbent composition according to any of the preceding adsorbent composition embodiments.

In some embodiments, the method further comprises extruding, pelletizing or tableting the adsorbent composition.

In another aspect of the present disclosure, the method comprises preparing an adsorbent composition comprising a bismuth material and a promoter, the method comprising combining a bismuth material or a bismuth precursor, a promoter or a promoter precursor and optionally a support to form the composition, wherein the combining comprises co-precipitation.

In another aspect of the present disclosure, an adsorbent composition is prepared according to any of the preceding method embodiments.

In another aspect of the present disclosure, a method of adsorbing an arsenic material comprises contacting a process stream containing an arsenic material with an adsorbent composition comprising a bismuth material and a promoter. In some embodiments, the adsorbent composition comprises a support.

In some embodiments, the method results in an arsine removal efficiency of ≥90%, ≥91%, ≥92%, ≥93%, ≥94%, ≥95%, ≥96%, ≥97%, ≥98% or ≥99%, as measured by a dry colorimetry method using an arsine analyzer. In some embodiments, the method results in an improved arsine removal efficiency of ≥15%, ≥20%, ≥25%, ≥35%, ≥45%, ≥55%, ≥65%, ≥75%, ≥85%, ≥95%, ≥105%, ≥110%, ≥115%, ≥125% or ≥135%, compared to the same composition not containing the promoter, as measured by a dry colorimetry method using an arsine analyzer.

In some embodiments, the process stream is a stream of a process selected from a group consisting of a petroleum process, a petrochemical process, a polymerization process, a synthesis gas process and a semiconductor process.

In some embodiments, the process stream is a stream of a petrochemical process.

In some embodiments, the process stream is a stream of a process selected from a group consisting of refinery off-gas, fluid catalytic cracking off-gas, steam cracker off-gas, shale gas and combinations thereof.

In some embodiments, the process stream comprises acetylene, methyl acetylene or propadiene or a combination thereof. In some embodiments, the process stream comprises ethylene and/or propylene. In some embodiments, the process stream comprises natural gas.

DETAILED DESCRIPTION

Bismuth material includes any bismuth-containing compounds including elemental bismuth and bismuth oxides, for example bismuth (III) oxide ($Bi_2O_3$). Promoters include compounds that function to promote or enhance arsine adsorbent performance of a bismuth material. Suitable promoters include tungsten materials and silicon materials, for example tungsten oxide and silicon oxide.

Present adsorbent compositions may consist essentially of a bismuth material and a promoter, for example the materials being in a bulk form. The adsorbent compositions may comprise a bismuth material dispersed on a support and/or a promoter dispersed on a same or different support.

Supports include metal oxides, metalloid oxides, activated carbons and molecular sieves. For example, supports include titanium oxide, ceria, alumina, silica, zirconia, magnesium oxide, zeolites and combinations thereof. In certain embodiments, supports include titanium dioxide, for example anatase titanium dioxide. In certain embodiments, supports include silica. Supports include high surface area metal oxides. In some embodiments, supports may comprise aluminum oxide. In other embodiments, supports may comprise a mixture of titanium dioxide and aluminum oxide. Metal oxide mixtures, for example a mixture of titanium dioxide and aluminum oxide, may contain metal oxides in a weight/weight ratio of titanium dioxide to aluminum oxide of from any of about 9/1, about 8/1, about 7/1, about 6/1, about 5/1, about 4/1, about 3/1, about 2/1 or about 1/1 to any of about 1/2, about 1/3, about 1/4, about 1/5, about 1/6, about 1/7, about 1/8 or about 1/9.

In certain embodiments, the adsorbent compositions comprise from about 5 wt % (weight percent) or about 10 wt % to about 65 wt % or about 75 wt % support, based on the total weight of the composition. In certain embodiments, the support comprises from about 5 wt % or about 10 wt % to about 55 wt % or about 75 wt % metal oxide, based on the total weight of the support.

The support may have a surface area of from about 10 $m^2/g$ or about 20 $m^2/g$ to about 450 $m^2/g$ or about 600 $m^2/g$. The support may be in particulate form, for example comprising particles having an average particle size of from about 1 μm or about 25 μm to about 1 mm or 10 mm.

The support may have a pore volume of from about 0.01 $cm^3/g$ or about 0.1 $cm^3/g$ to about 2.5 $cm^3/g$ or about 5.0 $cm^3/g$. The support may have pores having an average pore size (pore diameter) of from about 1 angstrom or about 5 angstroms to about 450 or about 750 angstroms. The pore volume and pore size are prior to having any materials dispersed thereon.

The adsorbent compositions may comprise from about 0.1 wt % or about 1.0 wt % to about 20.0 or about 50.0 wt % bismuth material, on a bismuth metal basis and based on the total weight of the composition.

The adsorbent compositions may comprise from about 0.05 wt % or about 1.0 wt % to about 10.0 or about 25 wt % promoter, based on the total weight of the composition.

Advantageously, the adsorbent compositions contain little or no lead. For instance, the adsorbent compositions may comprise ≤20 wt %, ≤20 wt %, ≤10 wt %, ≤5 wt % or ≤1 wt % lead, as lead oxide (PbO), based on the total weight of the composition. The adsorbent compositions may be free of or substantially free of lead.

The adsorbent composition may further comprise one or more compounds selected from a group consisting of silver oxide, iron oxide, manganese oxide, cerium oxide, vanadium oxide, tin oxide and niobium oxide. These further compounds may be present for instance at levels as described for the promoter.

In certain embodiments, the adsorbent composition may comprise from about 2 wt %, about 3 wt %, about 4 wt %, about 5 wt %, about 6 wt %, about 7 wt %, about 8 wt %, about 9 wt %, about 10 wt % or about 11 wt % to about 12 wt %, about 13 wt %, about 14 wt %, about 15 wt %, about 16 wt %, about 17 wt %, about 18 wt %, about 19 wt % or about 20 wt % bismuth oxide on a bismuth metal basis; from about 1 wt %, about 2 wt %, about 3 wt %, about 4 wt % or about 5 wt % to about 6 wt %, about 7 wt %, about 8 wt %, about 9 wt %, about 10 wt % or about 11 wt % tungsten oxide; and from about 69 wt %, about 72 wt %, about 75 wt %, about 78 wt %, about 81 wt %, about 84 wt %, about 87 wt % or about 90 wt % to about 92 wt %, about 93 wt % or about 94 wt % titania, based on the total weight of the composition.

The adsorbent composition may exhibit an arsine removal efficiency of ≥90%, ≥91%, ≥92%, ≥93%, ≥94%, ≥95%, ≥96%, ≥97%, ≥98% or ≥99%, measured by a dry colorimetry method using an arsine analyzer.

The adsorbent composition may exhibit an improved arsine removal efficiency of ≥15%, ≥20%, ≥25%, ≥35%, ≥45%, ≥55%, ≥65%, ≥75%, ≥85%, ≥95%, ≥105%, ≥110%, ≥115%, ≥125% or ≥135%, compared to the same composition not containing the promoter, measured by a dry colorimetry method using an arsine analyzer. Arsine removal efficiency may be determined as in the working Examples, where "arsenic uptake" is determined on spent adsorbent after adsorbing arsine. Arsenic uptake represents wt % arsenic per weight of fresh adsorbent at a certain point during as adsorption process, for example at a point of 90% efficiency. Arsenic uptake is a measure of arsine capacity of an adsorbent which in turn is a measure of arsine removal efficiency.

Also subject of the invention are the above-mentioned adsorbent compositions further comprising an arsenic material. Arsenic materials are selected from a group consisting of elemental arsenic and arsenic compounds, for example arsine. The adsorbent compositions may comprise from about 0.01 wt % or about 0.1 wt % to about 14.0 wt % or about 20.0 wt % arsenic material, based on the total weight of the composition.

The adsorbent compositions may be prepared by a variety of means. For instance, bulk powders of a bismuth material or bismuth precursor, promoter or promoter precursor and optionally a support may be combined by a variety of methods including co-precipitation, dispersion or physical mixing. Physical mixing includes for example compaction methods and coating methods.

In certain embodiments, a bismuth material or bismuth precursor and a promoter or promoter precursor are dispersed on a support. Precursors include organic compounds, inorganic compounds, salts and metals. Suitable bismuth precursors include bismuth citrate and bismuth nitrate. Suitable tungsten precursors include for instance ammonium metatungstate and other tungsten salts. Dispersion on a support may be achieved via an incipient-wetness technique. For instance, dispersion of bismuth precursors and promoter precursors on a support may provide a support having bismuth oxide and for instance tungsten oxide impregnated on/in the support. The term "dispersed form" may be synonymous with "dispersed thereon", "impregnated in", "supported by/on" and the like.

Impregnated in general means that the materials are "in" pores of the support. Reported pore volume and pore size of a support are without any materials impregnated therein.

It may be advantageous to dry the support prior to having suitable components dispersed thereon. The support may for instance have a moisture content of ≤15%, ≤10%, ≤5% or ≤0.5%, based on the total weight of the support. The support may contain essentially no moisture. The term "suitable components" means bismuth material or bismuth precursor and promoter or promoter precursor and optionally a support and other optional materials.

In some embodiments elemental bismuth or bismuth oxide may be physically mixed with a promoter or promoter precursor and optionally a support. A mixture of suitable components, for example in a bulk powder form, may be compacted together.

Coatings of suitable components may for example be applied via a washcoat technique. For example, a coating (washcoat) may be formed by preparing a slurry containing a specified solids content (e.g., 10-60% by weight) of a suitable component in a liquid vehicle, which is then coated onto a desired substrate such as a support and dried and calcined to provide a coating layer. When multiple coating layers are applied, the substrate may be dried and calcined after each layer is applied and/or after the number of desired multiple layers are applied.

The suitable components may be present in the adsorbent compositions in a bulk form, meaning in a continuous form in general not interrupted by other materials. A bulk form may contain substantially no other materials.

Accordingly, the adsorbent compositions may be in any suitable final form, for instance tablets, extrudates, pellets, rods, moldings or monoliths, etc., in various shapes and sizes. For instance, the shapes may have an average largest diameter of from about 1 mm, about 2, about 3 or about 4 mm to about 5 mm, about 6, about 7, about 8, about 9 or about 10 mm.

In certain embodiments, the promoter or promoter precursor is combined in a first step with a support to provide a "supported promoter". The support may have the promoter in a dispersed form or coating form "on" or "impregnated in" the support. The bismuth material or bismuth precursor is then combined with the supported promoter in a second subsequent step to provide the adsorbent composition. Drying and calcination may be performed after each step. In some embodiments, the steps may be reversed.

Embodiments of the invention also include a method of adsorbing an arsenic material, the method comprising contacting a process stream containing an arsenic material with an adsorbent composition as described herein. The process stream may be a stream of a petroleum process, a petrochemical process, a polymerization process, a synthesis gas process or a semiconductor process. For instance, the process stream may be a stream of a process selected from a group consisting of refinery off-gas, fluid catalytic cracking off-gas, steam cracker off-gas, shale gas and combinations thereof. The process stream may comprise acetylene, methyl acetylene, propadiene or a combination thereof. The process stream may comprise ethylene and/or propylene. The process stream may comprise a natural gas.

In some embodiments, the process streams contain an arsenic material, for instance arsine, at levels of from about 0.1 ppmw (parts per million by weight), about 0.5, about 1, about 10 or about 25 ppmw to about 50 ppmw, about 100, about 150 or about 200 ppmw, based on the process stream.

The adsorbent compositions may be employed in suitable equipment including packed bed columns, fluidized beds, monoliths, cartridge filters, semiconductor process tools, and the like. Operating temperatures during an adsorbent process may be for example from about 10° C., about 20° C., about 25° C., about 30° C., about 50° C. or about 60° C. to about 80° C., about 100° C., about 125° C. or about 150° C. For instance, an adsorption process for a liquid stream may be performed at about 50° C. and for a gaseous stream at about 130° C. Operating pressures for an adsorption process may be from about 1 bar, about 5 bar, about 10 bar, about 20 bar or about 30 bar to about 50 bar, about 70 bar, about 90 bar or about 100 bar. Operating gas hourly space velocities may from about 20 $h^{-1}$ or less, about 30 $h^{-1}$, about 50 $h^{-1}$, about 100 $h^{-1}$, about 500 $h^{-1}$, about 1000 $h^{-1}$ or about 2000 $h^{-1}$ to about 5000 $h^{-1}$, about 7500 $h^{-1}$ or about 10000 $h^{-1}$.

For example, a gas hourly space velocity for a liquid stream may be about 20 h$^{-1}$ or less and for a gaseous stream may be about 10000 h$^{-1}$.

According to the invention, particle size is synonymous with particle diameter (largest diameter) and may be determined for instance by scanning electron microscopy (SEM) or transmission electron microscopy (TEM). Average particle size is synonymous with D50, meaning half of the population resides above this point, and half below. Particle size refers to primary particles. Particle size may be measured by laser light scattering techniques, with dispersions or dry powders.

Unless otherwise indicated, all parts and percentages are by weight. Weight percent (wt %), if not otherwise indicated, is based on an entire composition free of any volatiles, that is, based on dry solids content.

ILLUSTRATIVE EXAMPLES

The following examples are set forth to assist in understanding the disclosure and should not, of course, be construed as specifically limiting the embodiments described and claimed herein. Such variations of the embodiments, including the substitution of all equivalents now known or later developed, which would be within the purview of those skilled in the art, and changes in formulation or minor changes in experimental design, are to be considered to fall within the scope of the embodiments incorporated herein.

Example 1: Bismuth Oxide and Tungsten Oxide on Titania Powder

Titania powder (anatase) having a surface area of 291 m$^2$/g and a pore volume of 0.41 mL/g support is dried overnight at 110° C. to remove residual water. Ammonium metatungstate is dissolved in deionized water to obtain a solution having a tungsten metal concentration of about 2.4 wt %. About 18 g of the tungsten solution is impregnated on about 20 g of dry titania powder using a conventional incipient-wetness method to yield a solid having approximately 2.15 wt % tungsten as metal. This solid is dried overnight at 110° C. and calcined for 2 h at 400° C. Bismuth citrate is dissolved in ammonia hydroxide to obtain a solution having approximately 12.8 wt % bismuth as metal. A 17 g portion of this solution is impregnated on the titania-supported tungsten using an incipient-wetness technique to provide a material having approximately 9.4 wt % Bi as metal. The product is dried at 110° C. overnight and calcined at 400° C. for 2 h. This corresponds to Sample A.

The above process is repeated, with reversal of the order of impregnation of bismuth and tungsten. This corresponds to Sample B.

Comparative samples include a commercially available adsorbent of PbO-impregnated alumina (Sample C). Comparative Samples D and E are prepared as above to contain only bismuth oxide and tungsten oxide, respectively. Comparative Sample D is "tungsten free" and contains approximately 9.4% Bi as metal. Comparative Sample E is "bismuth free" and contains 2 wt % tungsten as metal.

Example 2: Arsine Removal

About 1 mL of adsorbent is loaded into a reactor. Liquid propane containing about 100 ppmw of arsine is passed through the reactor at ambient temperature and a pressure of about 220 psig. The liquid hourly space velocity is set to 10 h$^{-1}$. The liquid stream passing the reactor is analyzed for arsine content. The experiment is conducted until about 10 ppmw arsine is breaking through the reactor, indicating 90% removal efficiency.

Results are shown in Table 1. The "arsenic uptake" is determined on spent adsorbent. Arsenic uptake represents wt % arsenic per weight of fresh adsorbent at the point of 90% efficiency. This is a measure of arsine capacity of an adsorbent which in turn is a measure of arsine removal efficiency.

TABLE 1

| Sample | Arsenic uptake (wt %) |
| --- | --- |
| A | 5.2 |
| B | 3.8 |
| C | 2.4 |
| D | 4.1 |
| E | <1 |

Samples A and B are inventive. Samples C, D and E are comparative. Sample A exhibits an improved arsine removal efficiency of 27% compared to sample D and 117% compared to sample C.

Example 3: Bismuth Oxide and Tungsten Oxide on a Titania Extrudate

Example 1 is repeated, replacing titania powder with titania extrudates (⅛" diameter) and employing bismuth nitrate (20 wt % bismuth metal stock solution) in place of bismuth citrate. Samples are prepared having: 1.4 wt % and 6.5 wt % tungsten as metal (Sample F); and approximately 11 wt % bismuth as metal (Sample G).

A tungsten-free sample, Sample H, is prepared by impregnating bismuth nitrate on titania extrudates.

Example 4: Arsine Removal

Arsenic uptake is determined as in Example 2. Results are shown in Table 2. Arsenic uptake represents wt % arsenic per weight of fresh adsorbent at the point of 90% efficiency. This is a measure of arsine capacity of an adsorbent which in turn is a measure of arsine removal efficiency.

TABLE 2

| Sample | Arsenic uptake (wt %) |
| --- | --- |
| F | 5.5 |
| G | 8.6 |
| C | 2.4 |
| H | 5.0 |

Samples F and G are inventive. Samples C and H are comparative. Sample G exhibits an improved arsine removal efficiency of 72% compared sample H.

In the foregoing description, numerous specific details are set forth, such as specific materials, dimensions, processes parameters, etc., to provide a thorough understanding of the embodiments of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the use of the terms "a," "an," "the," and similar referents in the context of describing the materials and methods discussed herein (especially in the context of the following claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. Moreover, any permutations of recited values are contemplated as defining the bounds of ranges. For example, a range of 1, 2, or 3 to 4, 5, or 6 is understood to include not just 1 to 4, 1 to 5, 1 to 6, 2 to 4, 2 to 5, etc., but also 1 to 2, 1 to 3, 2 to 3, 4 to 6, etc.

The term "about" used throughout is used to describe and account for small fluctuations that may be introduced via experimental or measurement error (e.g., ±1%). All numeric values are modified by the term "about" whether or not explicitly indicated. Numeric values modified by the term "about" include the specific identified value. For example "about 5.0" includes 5.0.

The term "essentially no" or "substantially no" or "substantially free of" means "not purposefully added" and only trace or inadvertent amounts may be present, for instance ≤5 wt %, ≤4 wt %, ≤3 wt %, ≤2 wt %, ≤1 wt %, ≤0.5 wt % or ≤0.25 wt %, based on the weight of the composition referred to, for example the total adsorbent composition. For example, an adsorbent composition that is substantially free of lead may refer to an adsorbent composition for which lead is below a detectable limit, or its presence has a negligible effect on the performance of the adsorbent.

Reference throughout this specification to "one embodiment," "certain embodiments," "one or more embodiments," "an embodiment," or "some embodiments" means that a particular feature, structure, material, or characteristic described in connection with the embodiment is included in at least one embodiment of the present disclosure. Thus, the appearances of the phrases such as "in one or more embodiments," "in certain embodiments," "in one embodiment," or "in some embodiments" in various places throughout this specification are not necessarily referring to the same embodiment of the present disclosure. Furthermore, the particular features, structures, materials, or characteristics may be combined in any suitable manner in one or more embodiments.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Although the embodiments disclosed herein have been described with reference to particular embodiments it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

What is claimed is:

1. An adsorbent composition comprising a bismuth material, a promoter, and a support, wherein the support comprises particles having a particle size of from about 1 μm to 10 mm, wherein the bismuth material and the promoter are each dispersed within pores of the support via incipient-wetness impregnation of precursors of the bismuth material and the promoter onto the support, wherein the promoter comprises a silicon material or a tungsten material, and wherein:
   the bismuth material is present as bismuth oxide from about 2 wt % to about 20 wt % on a bismuth metal basis, based on the total weight of the adsorbent composition,
   the promoter is present from about 1 wt % to about 11 wt %, based on the total weight of the adsorbent composition, and
   the balance of the weight of the adsorbent composition consists essentially of the support, the support being selected from a titanium oxide, an aluminum oxide, activated carbon, or a molecular sieve.

2. The adsorbent composition according to claim 1, wherein the bismuth material comprises bismuth (III) oxide ($Bi_2O_3$).

3. The adsorbent composition according to claim 1, wherein the support comprises titanium dioxide or anatase titanium dioxide.

4. The adsorbent composition according to claim 1, wherein the support comprises aluminum oxide or titanium oxide.

5. The adsorbent composition according to claim 1, wherein the support has a surface area of from about 10 $m^2/g$ to about 600 $m^2/g$.

6. The adsorbent composition according to claim 1, wherein the composition further comprises ≤20 wt % lead oxide, based on the total weight of the composition.

7. The adsorbent composition according to claim 1, wherein the adsorbent composition is substantially free of lead.

8. The adsorbent composition according to claim 1, wherein the composition is in a form selected from a group consisting of tablets, extrudates, pellets, rods, moldings and monoliths, and wherein the composition further comprises one or more compounds selected from a group consisting of silver oxide, iron oxide, manganese oxide, cerium oxide, vanadium oxide, tin oxide and niobium oxide.

9. The adsorbent composition according to claim 1, wherein the support has a pore volume of from about 0.01 $cm^3/g$ to about 5.0 $cm^3/g$, and wherein the support contains pores having an average pore size of from about 1 Å to about 750 Å.

10. The adsorbent composition according to claim 1, wherein the promoter is tungsten oxide and the support is titania.

11. The adsorbent composition according to claim 1, having an arsine removal efficiency of ≥90%, as measured by a dry colorimetry method using an arsine analyzer.

12. The adsorbent composition according to claim 1, which exhibits an improved arsine removal efficiency of ≥15% compared to the same composition not containing the promoter, as measured by a dry colorimetry method using an arsine analyzer.

13. A method of preparing an adsorbent composition comprising a bismuth material, a promoter, and a support, the method comprising dispersing a bismuth precursor and a promoter precursor into pores of the support via incipient wetness impregnation, wherein the promoter or the promoter precursor comprises a silicon material or a tungsten material.

14. An adsorbent composition consisting essentially of bismuth oxide, tungsten oxide, and titania support particles, wherein a particle size of the titania support particles is from about 1 μm to 10 mm.

* * * * *